United States Patent
Li et al.

(10) Patent No.: US 10,042,882 B2
(45) Date of Patent: Aug. 7, 2018

(54) ANALYTICS APPLICATION PROGRAM INTERFACE

(71) Applicant: Microsoft Technology Licensing, LLC, Redmond, WA (US)

(72) Inventors: Haipeng Li, Mountain View, CA (US); Swaminath Veeramani, Fremont, CA (US); Paul Hyunwoo Ko, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

(21) Appl. No.: 14/601,377

(22) Filed: Jan. 21, 2015

(65) Prior Publication Data

US 2016/0210327 A1 Jul. 21, 2016

(51) Int. Cl.
*G06F 17/30* (2006.01)

(52) U.S. Cl.
CPC .. *G06F 17/30395* (2013.01); *G06F 17/30528* (2013.01)

(58) Field of Classification Search
CPC .............. G06F 17/30395; G06F 17/30528
See application file for complete search history.

(56) References Cited

U.S. PATENT DOCUMENTS

| | | | | |
|---|---|---|---|---|
| 2012/0198369 | A1* | 8/2012 | Sorin | G06Q 10/10 715/763 |
| 2012/0233212 | A1* | 9/2012 | Newton | G06Q 30/02 707/774 |
| 2012/0246154 | A1* | 9/2012 | Duan | G06F 17/30477 707/728 |

* cited by examiner

*Primary Examiner* — Dinku Gebresenbet
(74) *Attorney, Agent, or Firm* — Schwegman Lundberg & Woessner, P.A.

(57) ABSTRACT

Generally discussed herein are methods, systems, and apparatuses for retrieving analytics data or other data from a plurality of data sources. In one or more embodiments, a method can include receiving from a client a request to retrieve analytics data, and in response to receiving the request automatically issuing a first query for analytics data from a first data source, the first query in a first format; and automatically issuing a second query for data from a second data source different from the first data source, the second query in a second format different from the first format. The method can include providing the analytics data and the data.

12 Claims, 7 Drawing Sheets

ANALYTICS APPLICATION PROGRAM INTERFACE

TECHNICAL FIELD

Examples generally relate to systems, apparatuses, and methods for issuing queries to multiple databases that store data in a variety of different formats.

BACKGROUND

Data, such as can be used for analytics, can be stored in a variety of formats and/or on a variety of storage mediums (e.g., databases or other memories). Different communication protocols can be required to access data on different storage mediums. Data on a storage medium may not be available to a user external to an entity that is maintaining the storage medium. A user may wish to receive data from multiple different storage mediums. Such a user may need to determine how to perform a query on each storage medium that the user wants to access to get a result. Such a system is cumbersome in that a user is required to know a variety of query protocols and to know the storage medium on which the pertinent data is stored.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed herein.

DESCRIPTION OF EMBODIMENTS

Figure 1:
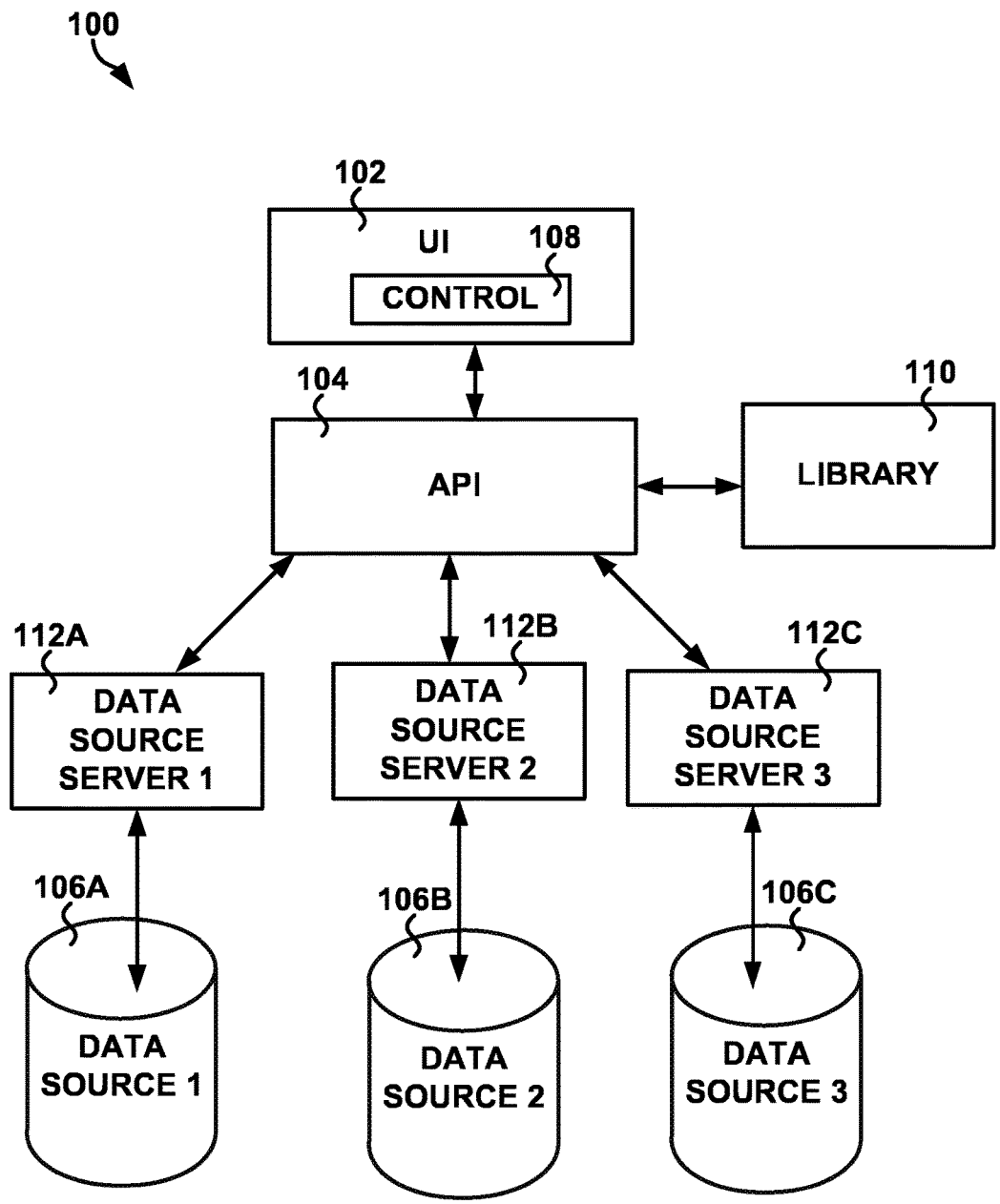
FIG. 1 illustrates, by way of example, a block diagram of an embodiment of a system for automatically querying multiple data sources.

Discussed generally herein are systems, devices, and methods for performing queries on data from multiple data sources (e.g., a database or other or other storage medium or repository). More specifically, one or more embodiments discussed herein can include an API that retrieves data from multiple data sources automatically (e.g., without human interference after deployment of the API), such as can be in response to receiving a request for analytics data.

In performing analytics on data, some analytics queries cannot be answered by querying a single data source. As used herein "analytics data" is a quantification of data stored on a data source. For example, data can include stored profiles of users of a social networking site. Analytics data can include, for example, the number of users that include a specific characteristic or profile parameter, the number of users that have clicked on an article posted on the social networking site, a number of users that have liked, posted, or followed another user, etc.

A user interested in receiving analytics data that requires querying multiple data sources can query each of the multiple data sources independently to retrieve the information needed to answer the question. However, such an approach can require specialized knowledge on how to perform a query on each of the multiple data sources and can require knowledge of the data that is stored on each of the multiple data sources. Another solution can include converting all the data needed to determine an answer to the analytics question to a unified format, storing the unified data on a single medium, and performing a single query on the data in the unified format. However, such an approach requires all data to be unified and knowledge of how to unify the data. One or more embodiments discussed herein can provide a solution to one or more of the problems discussed.

In one or more embodiments, an API can be configured to receive data corresponding to a request for data (e.g., a single request). The request can be issued by a user through a user interface (UI). The API can issue one or more queries to multiple data sources in providing a result to the request. The API can be configured to convert verbose language in the query to one or more keys that are translatable by the API. The API can be configured to analyze the query and determine the type of data that is being requested, and based on the type(s) of data being requested, the API can determine which of a plurality of data source to query to receive the information.

One or more APIs discussed herein can provide standardized querying across data sources. Such standardization can allow a user to perform a query on multiple data sources that may require different query protocols, while using a single unified query format. One or more APIs discussed herein can provide metadata mapping that is transparent to the user. The metadata mapping can provide a mechanism for the standardized querying. The metadata mapping can also provide a mechanism that allows a user to issue a query to the API using verbose language or keys and the API to issue a query to a data source using one or more keys or verbose language, respectively. The API can provide a mechanism through which data from multiple data sources can be joined (e.g., using an SQL "join" command).

Reference will now be made to the figures to describe details of one or more embodiments. Generally, an embodiment is discussed with reference to a social network system that can provide data that can queried, however, the system is not limited to this context. The system(s), apparatus(es), and method(s) can be implemented in an API that can be implemented on a computing device as a standalone, add-on, or plug-in for another application, among other implementations.

FIG. 1 illustrates, by way of example, a block diagram of an embodiment of a system 100 for automatically querying multiple data sources 106A-C. The system 100 can include a user interface (UI) 102 (sometimes referred to as a "front end"), an API 104 (sometimes referred to as a "logic layer"), and a plurality of data sources 106A, 106B, and/or 106C and data source servers 112A, 112B, and/or 112C (sometimes referred to as a "back end" or "data layer"). FIG. 1 shows three data sources 106A-C, however the system 100 is not limited to this number of data sources; any number of data sources greater than one can be used.

The UI 102 can be implemented by executing an application on a client device, such as a mobile device, laptop, desktop, Personal Digital Assistant (PDA), tablet, e-reader, or other device including a display mechanism and operable to execute application code. The UI 102 can provide a mechanism through which a user can access data on the data sources 106A-C. The UI 102 can include an input control 108 through which a user can issue a request. The control 108 can include an input box that a user can interact with, such as by using a touch screen of the UI, a keyboard (e.g., a keypad) and a mouse, a stylus, a microphone, or other input device, to issue a request to the API 104. The control 108 can include a search box in which a user can type or otherwise enter text, a button a user can select to begin a voice recognition operation, or other control that can otherwise be used to allow a user to issue a request for data to the API 104.

The request can be any type of request capable of conveying to the API the information that the user wishes to obtain. The request can include a request for analytics information, such as can be performed on data on one or more of the data sources, such as through a data source server 112A, 112B, or 112C. The data source servers 112A-C can help facilitate access to the data stored on a data source 106A-C coupled thereto. The data source server 112A-C can perform one or more mathematical operations, such as count, sum, subtraction, division, multiplication, calculus, or other operation. Some examples of data source servers include servers from Oracle Corporation of Redwood Shores, Calif., DB2® from IBM® Corporation of Armonk, N.Y., and a Microsoft SQL server from Microsoft Corporation of Redmond, Wash. Examples of open source database servers include Ingres and MySQL. Other examples of database servers include Pinot from LinkedIn® Corporation of Mountain View, Calif., and a server (e.g., a web server or a Hadoop® server) from Apache Corporation of Houston, Tex. While FIG. 1 shows the data source server and the data source as separate entities, the data source server may actually include the data source and vice versa. The data source can include the functionality of the data source server and the data source server can include data stored thereon as would be stored on the data source. The functionality difference between a data source and the server that facilitates access to the data stored on the data source is not always consistent across data sources and data source servers. Some data sources can include processing circuitry and some data source servers can include memory and data stored thereon. In an instance in which a data source includes circuitry to facilitate access to the data source, the access circuitry operates as the data source server.

The request can be a request for content, such as document content, an identification (ID) or other metadata associated with a document, website content, content stored in a specific location on a specific database, such as one or more user characteristics (e.g., user address, demographic information, current employer, past employer, or other user characteristic), or a combination thereof, among others. The request can be a request for analytics data on the data stored in the data sources. The request can include a request for analytics data and content.

The API 104 can receive the request directly from the UI 102 or an intermediary between the UI 102 and the API 104. The API 104 can include routines (functions), protocols, and/or tools for performing queries on multiple data sources (e.g., simultaneously or sequentially). The API 104 includes definitions of a process in terms of one or more operations, inputs, outputs, and/or types independent of the implementation so as to allow the implementation to vary and remain flexible. The API 104 can be communicatively coupled to a library 110 that includes the specifications for the functions, protocols, tools, and/or associated data structures, object classes, or variables. The functions performed by the API 104 can include remotes calls hidden from the UI 102 that are configured to be performed based on the contents of the request received at the API 104.

The API 104 accesses the data sources 106A-C, such as by querying the data source servers 112A-C. The API 104 can analyze the request from the UI for a type of data requested. The type of data requested can be determined by analyzing the request generally and/or analyzing the return type specified in the query. For example, a query for the top trending articles on a website can include a return type indicating analytics data (e.g., engagement numbers) and/or content (e.g., the articles themselves) is requested. In another example, a query for user engagement with a profile can include a return type indicating analytics data and/or content that is associated with the engagement. The API 104 can determine the type of data being requested by looking up a request type in the library 110.

The results returned by the API 104 can be in a variety of formats compatible with the UI 102. In one or more embodiments, the results returned by the API 104 can be in a JavaScript Object Notation (JSON) format.

The library 110 can include definitions of query formats for the data source servers 112A-C, data source paths that define the location and/or access port of the data source servers 112A-C, data structure definitions of the data on the data sources, and/or a hierarchy of data sources to query, such as can be organized based on the requested return type of data. For example, the hierarchy of data sources to query can include a default ranking of data sources to query for article content, article metadata, user profile information, user engagement numbers, or a combination thereof, among others. For example, the hierarchy can indicate that the API 104 is to query the data source 106A first and the data source 106C second if the data source 106A does not yield results for the query. The default ranking can be overridden by a user indicating a data source to query, for example. Examples of a query format definition, a data source path definition, and a data structure definition are provided below.

A query definition, such as can be stored in the API library, can be created and provided to the API 104, such as by adding the query definition to the library 110. An example of a definition for querying company impact data is provided:

```
{
    "queries". [
        {
            "queryId":"company_impact",
            "tableName": "ActivityData",
            "columns": [
                {
                    "name": "company_id"
                },
                {
                    "name": "employee_seniority"
                },
                {
                    "name": "company_activity",
                    "function": "SUM"
                }
                "name": "user_engagement",
```

```
            "function": "COUNT"
          }
    ] } ] }
```

An example data structure (e.g., table) definition, such as can be stored in the library 110, for the table "ActivityData" is provided:

```
{
  "tableConfig":
  [{
    "tableName": "ActivityData",
    "machineName": ["proxy.comany_name.com"] ]
  } ] }
```

An example of a data source data definition, such as can be stored in the library 110, for data stored on a Pinot database is provided:

pinot.query.scheme=http
pinot.query.port—21360
pinot.query.path-/d2/impact_data
pinot.query.cluster.name=impact_dataEvents An example of a request to retrieve impact data of high ranking employees for a company that has two company-_IDs is provided:

```
(
  "query": ["company_impact"],
  "filters": [
  [{
      "columnName": "company_ID",
      "condition": "equals",
      "value": [1337, 1447]
    },
    {
      "columnName": "employee_seniority",
      "condition": "equals",
      "value": ["CXO", "Owner", "Partner"]
    } ] ] }
```

An example of a response to the request for the impact data is provided for illustrative purposes:

```
[
  {
    "company_impact": [
    {
      "results": "success"
      "dimension": {
        "time_period": "201405"
      },
      "metric": {
        "count": "72761624"
      } ] } ]
```

The API 104 can provide a layer of security for the data stored on the data sources 106A-C. A user may be required to login (e.g., by providing a username and/or password) to verify that they are a valid user prior to allowing the user to request data using the API 104. Also, some data in the data sources 106A-C may include certain permissions to access and the API 104 or the data source servers 112A-C can handle the permissions, so as to ensure that users do not get access data which they should not be allowed to access.

The API 104 can provide flexibility to add or remove a data source without affecting the UI 102 or the request format of a request entered through the UI 102. By altering the hierarchy of data sources that the API 104 uses for certain searches, providing a query format definition for the new data source in the library, and defining metadata for entries on the data source (if needed), a new data source can be added and queried. In one or more embodiments, a server coupled to a database to provide access to the data of the data source may need to be programmed to be compatible with the API 104. In one or more embodiments, the database may be reorganized (e.g., indexed differently), such as to provide more efficient access to the data. For example, articles or other entries, such as entity names, can be indexed according to a Universal ID (UID) that is consistent across data sources.

The data sources 106A-C can include a variety of searchable and retrievable data indexed in a variety of ways. The data sources 106A-C can include any data on which analytics can be performed to produce analytics data. The analytics can be performed by the data source server 112A-C in performing the query or can be performed by the API 104 or an intermediary.

For example, analytics data can include a count of a number of entries stored in a data source 106A-C that match a specified criteria and/or can include the counted number of entries divided by a total to provide a ratio or a percentage. Consider a request issued through the UI 102 to determine a total percentage of Chief Executive Officers (CEOs) that have engaged (e.g., viewed, liked, favorite, tweeted, mentioned in a post, selected, viewed as a link, or the like) a posting on a social networking website. The API 104 can query a data source server (as determined by looking up the type of data in the library 110) to determine the total count of CEOs on the social networking website and query the same or different or a different data source server to determine the engagement numbers of those CEOs with the post. The queried servers can return the resulting two numbers or can perform a simple division and provide the percentage as a result. By providing the numbers, a user is getting more information regarding the population of the query (the number of CEOs in this example).

The data sources 106A-C can include any of a variety of data sources. The data sources can include an active, an animation, a back-end, a centralized, a cloud, a collection, a column-oriented, a cooperative, a correlation, a current, a distributed, a document-oriented, a government, a triple-store, a mobile, a navigational, an object, an online, an operational, a parallel, a probabilistic, a relational, a suppliers and parts, a temporal, a very large, a virtual private, a vulnerability data source, or a combination thereof. As used herein, a "data source" is a structured set of data accessible by a processor.

The data sources 106A-C can include a dynamic and/or static corpus of data. A dynamic corpus is one that changes, such as by rearranging the data on the corpus and/or adding data to the corpus. A static corpus is one that does not change, the data on the data source is fixed. One example of a static corpus is the New York Times historical collection and one example of a dynamic corpus is the BBC daily news corpus.

The system 100 can include a data source 106A-C that is dedicated to handling keys and associating verbose parameters to the keys. For example, the data sources 106A-C can include a MySQL database that the API 104 can query to help in converting a verbose request to a non-verbose (i.e. a key-based) query.

Figure 2:
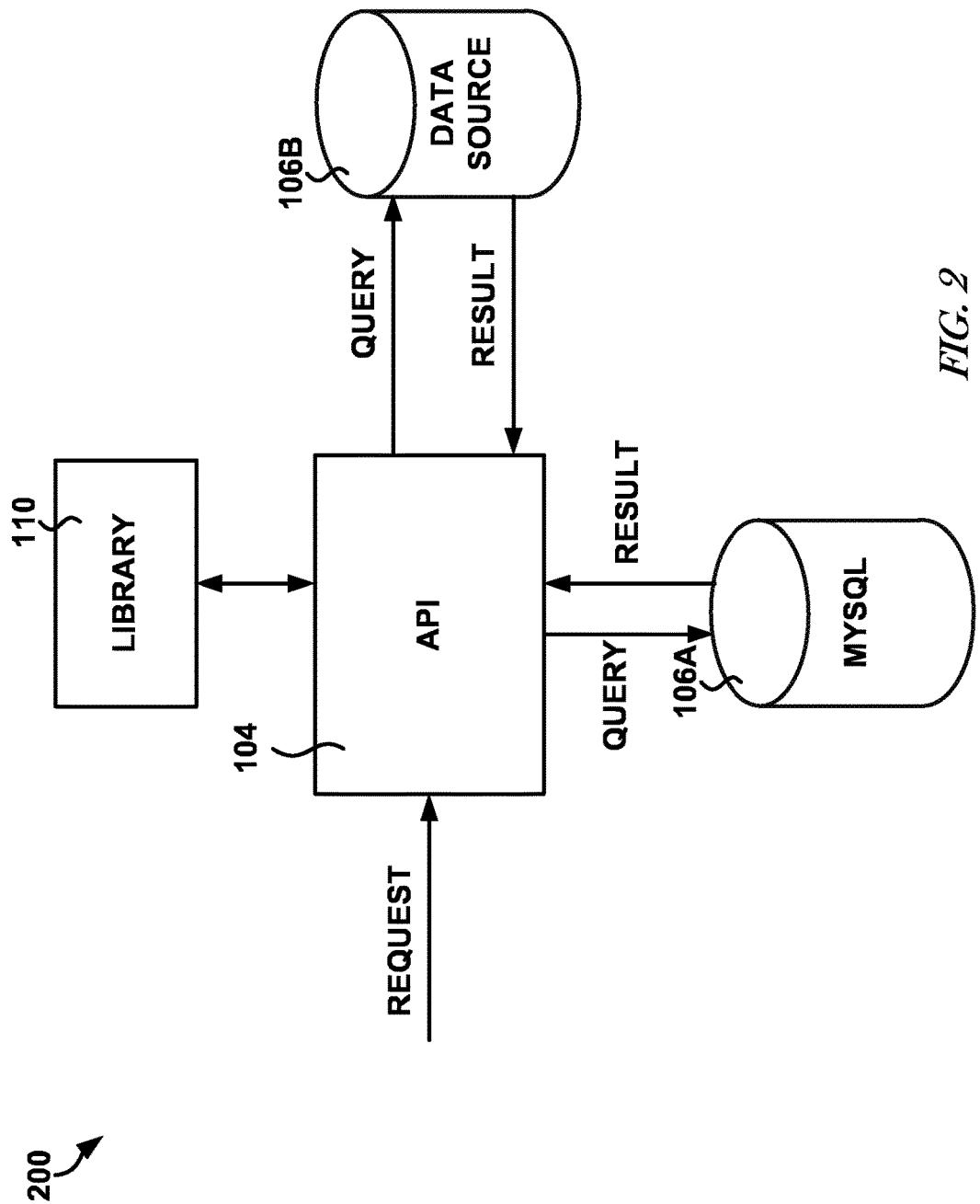
FIG. 2 illustrates, by way of example, a block diagram of a more specific embodiment of the system in which the first data source is a MySQL database.

FIG. 2 illustrates, by way of example, a block diagram of an embodiment of a system 200 for converting data received in a request from a first format to a second different format. The first format and second format can include a verbose format or a key format. The verbose format is one that uses words to describe the parameters of the request. For example, a request for a number of entries that include a certain seniority level at a profession issued as {column name: "seniority"; condition: "equals"; value: ["CXO", "Owner", "Partner"]} is a verbose request. At least some of the language of the verbose request can be converted to one or more keys, such as by converting the previous verbose language request to a query {select count(*) from Data Where seniority_2_sk in [8, 9, 10]}. Here, the language "CXO", "Owner", and "Partner" were converted to the keys "8", "9", and "10", respectively. The conversion can be accomplished by issuing a query, from the API 104 to a data source 106A or a corresponding data source server 112A, such as a MySQL database, that returns the keys associated with the verbose language. If verbose language is not recognized, an error can be issued indicating what language is not recognized. The API 104 can query another data source to try to retrieve the key(s) associated with the language. The returned key(s) can be used in querying other data sources.

Figure 3:
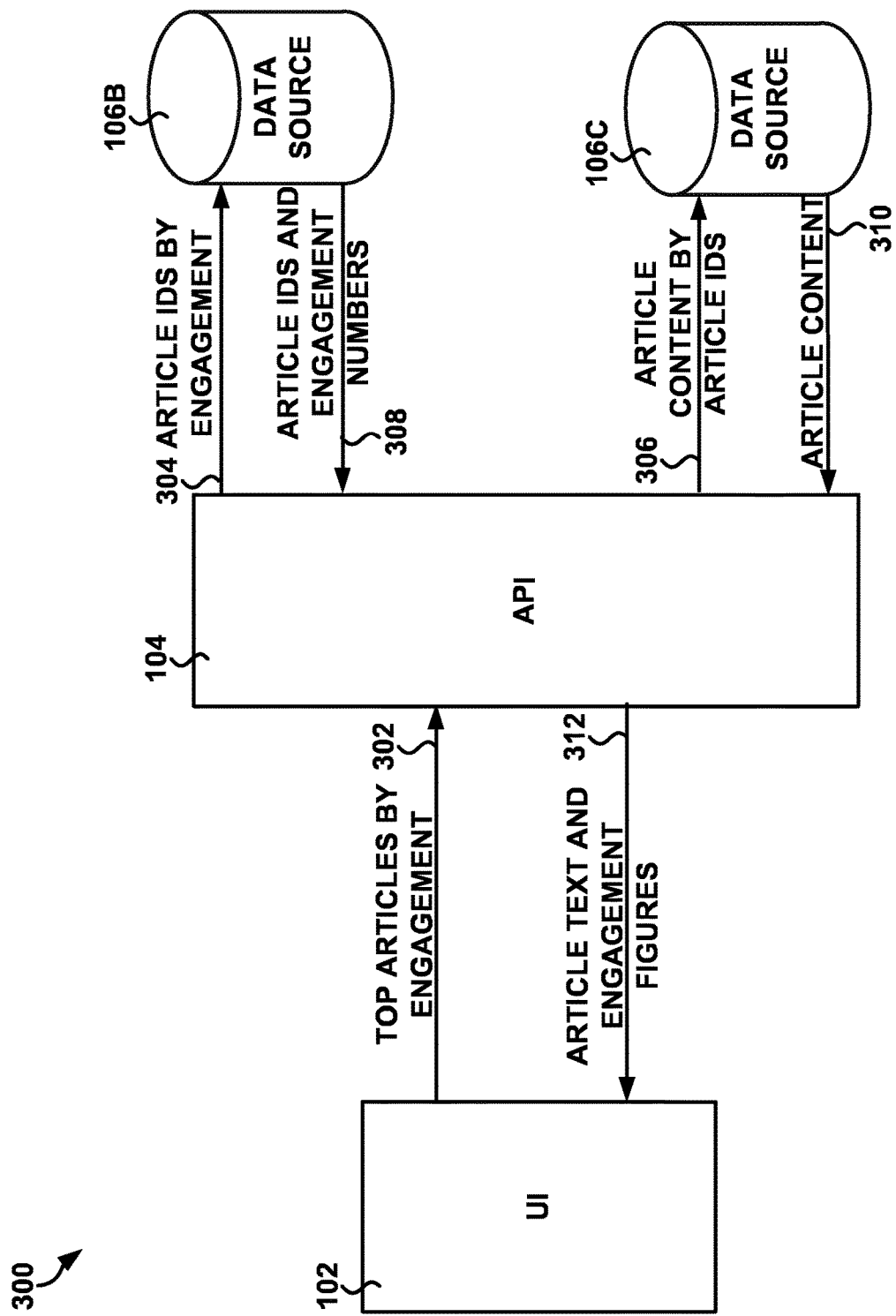
FIG. 3 illustrates, by way of example, a block diagram of a more specific embodiment of a use case of the system of FIG. 1.

FIG. 3 illustrates, by way of example, a block diagram of an embodiment of a system 300 for converting a single request into multiple queries for data from multiple respective data sources. A user can, using the UI 102, issue a request to receive the top articles by user engagement and the corresponding engagement numbers that make the articles the top articles by user engagement. The request can be provided to the API 104 using the connection 302. The request can specify a time period associated with the request. For example, a user may want to know what the top articles were last year at this time of year. The user can specify a range of dates in the request to indicate to the API 104 a time period associated with the request. The user can specify the type of user engagement (e.g., likes, views, clicks, shares, posts, tweets, mentions, or a combination thereof, among others) associated with the request. For example, a user can indicate in the request that the user wants to know the top ten articles with the most likes on LinkedIn for the month of February 2014 (e.g., {condition: "engagement: most likes (10)"; "time period: 022014"; "site: LinkedIn"}).

The user can specify the return data type to indicate to the API 104 the data the user is looking for. For example, in a request for top articles by user engagement, a user may want to know the article title, author, and the engagement numbers, or a user may want to know the content of the article and not the engagement numbers. The user can indicate to the API 104 the data to return by specifying a return type in the request. Default field entries, such as return types, can be provided in the library 110, such as to govern the API behavior in an instance where a user does not specify a return type or some other field in the request.

The API 104 can analyze the request and determine the data source(s) to be queried to satisfy the request. For example, in the example request of FIG. 3, assume that the user wants the article content, article metadata, and the engagement numbers for the top ten articles by number of likes on the LinkedIn social networking websites for February 2014. The API 104 can determine a hierarchy of data sources to query to retrieve the information requested. The hierarchy can be defined in the library 110. The API 104 can look up the hierarchy in the library 110 to determine the order in which the data sources will be queried. In the example of FIG. 3, the API 104 determines that it is to query the data source 106B for article IDs and engagement numbers associated with the article IDs that were most liked in the specified or default time period. This information can be stored on and retrieved from a single data source, such as a Pinot or Hadoop database (e.g., a database coupled to a Hadoop server), or can be stored on and retrieved from multiple data sources. To retrieve this data in the example of FIG. 3 the API 104 formats a query compatible with the data source 106B, such as can be defined in the library 110, and provides the query on the connection 304. The data source 106B can return the requested data on the connection 308.

In an instance where there is an error in the query from the API 104, the data source 106A-C or the associated data source server 112A-C can indicate that there is an error and what the error is. The data source 106A-C, in one or more embodiments, can return as much data as it can. For example, if the API 104 requests article content and engagement numbers and the data source only has article IDs and engagement numbers and does not have article content, the data source can return the engagement numbers and/or the article IDs and/or can indicate that it does not have the desired content. The API 104 can then determine what data source to query to retrieve the article content, such as by querying the next data source in the hierarchy of data sources in the library 110.

The API 104 can use the data retrieved in the first query (the query issued on the connection 304 in the example of FIG. 3) in formatting a second query to a different data source. In the example of FIG. 3, the API 104 uses the article IDs retrieved from the data source 106B to format a query to the data source 106C to retrieve article content by article ID.

Figure 4:
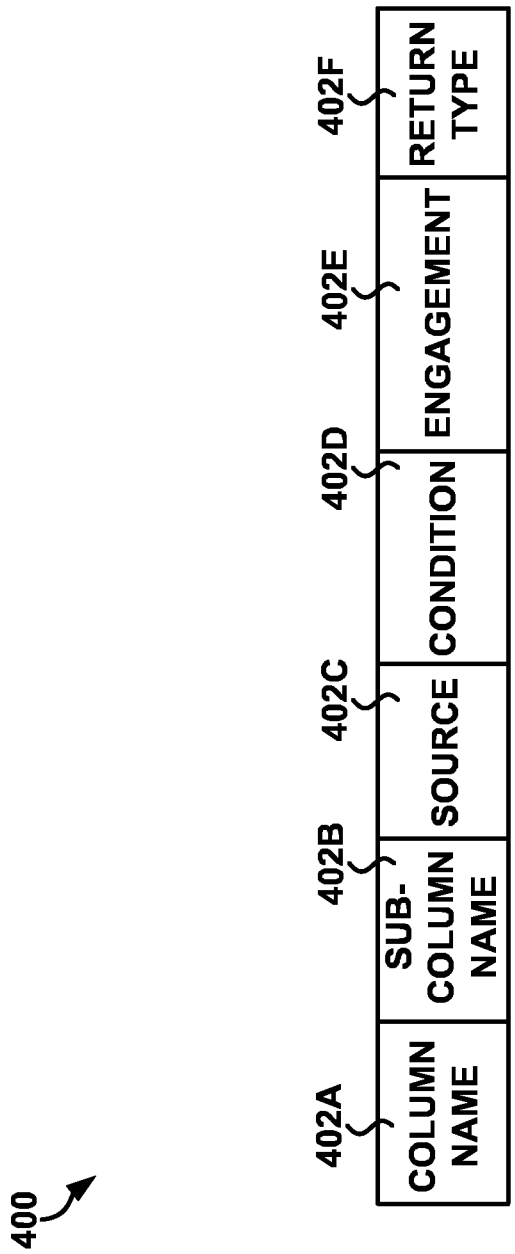
FIG. 4 illustrates, by way of example, a block diagram of an embodiment of query parameters.

FIG. 4 illustrates, by way of example, a block diagram of an embodiment of a query 400 issued from the API 104 and corresponding fields in the query. A request issued through the UI 102 can include fields similar to fields 402A-F of the query 400. The fields 402A-F, as illustrated include a column name field 402A, a condition field 402B, a source field 402C, a sub-column name field 402D, engagement field 402E, and a return type field 402F.

The column name field 402A can indicate a header title, such as for performing a query on a data source that is organized in an SQL format or other column based format, for example. In an embodiment that includes a data source that details user profile and activity information, a column name can include a user characteristic or activity data. The user characteristic can include profile information of the user, such as the member's name, contact information, current and/or past employment information, photographs, personal messages, status information, links to web-related content, blogs, and so on.

The sub-column name field 402B can include a header title that further details a column name field 402A. For example, a sub-column name can include a time of employment at a specific job where the column name is employment information, a link associated with a specific job (e.g., another user that also works or has worked at the same job as the user), a time associated with a status update, etc.

The source field 402C can indicate a data source, website, or other origin of data associated with the query 400. For example, the source field 402C can identify one or more specific data source(s) (e.g., an ID or name of the data source 106A-C) to be queried. In another example, the source field 402C can indicate an origin of the data to be queried and the API 104 can determine based on the identified origin which data source to query. For example, if the source is identified as LinkedIn, the API can query a Pinot, Hadoop, or Kafka database that stores LinkedIn data to retrieve results. In another example, if the source is Facebook®, the API 104 can query a data source that includes Facebook data stored thereon. In yet another example, if the source is the British Broadcasting Company, the API 104 can query a data source that includes BBC data stored thereon. The source field 402C can indicate a path to the data source.

The condition field 402D can indicate a mathematical relationship to be satisfied for each result to be returned. For example, the condition field 402D can include "greater than x", "less than x", "top x", "bottom x", or a combination thereof. The API 104 can limit the number of results returned by specifying a maximum number of results. The maximum number of results can be predefined and may or may not be overridden using the condition field 402D.

The engagement field 402E can indicate a type of user engagement that is required to return a result. For example, the user engagement can include likes, follows, tweets, clicks, posts, or other user engagement.

The return type field 402F can indicate the data to be returned and/or a format of the data to be returned. For example, a user can indicate that query data is to be returned in a file at a specific location and/or a format of the file, is to be stored on a web server and the data source is to provide a link to the data, or the like. In one or more embodiments, the user can indicate the content of the data to be returned using the return type field. For example, the user can indicate that the contents of an article and/or specific metadata of the article (e.g., author, publisher, length, date of publication, etc.) is to be returned. The user can indicate that a number is to be returned in a specific format (e.g., a percentage, a whole number, a float and/or how many decimal accuracy, etc.).

Not all fields need to be defined in each query. For example, if a user requests only the contents of a specified article, the engagement field is irrelevant and does not need to be defined by the user. In another example, if a user requests numbers that can be determined using only the column name field, the sub-column name field is irrelevant and does not need to be defined by the user, among other examples.

In one or more embodiments, the systems 100, 200, and/or 300 can be used to help an entity in determining their impact on a social networking website, such as LinkedIn, Facebook, Twitter, Instagram, etc. The impact can be determined by issuing a request to the API 104 to retrieve user engagement numbers or activity numbers for an entity and/or the other entities (e.g., one or more competitors of the entity). The activity numbers can include an entities posts (e.g., posts on behalf of the entity or posts by one or more employees of the entity), sponsored updates, entity updates, groups the entity is a member of, and/or influencer posts (posts that influence other posts). The impact of the entity can be computed using a combination of the entity activity numbers and the user engagement numbers with the entity activity on the social networking site. The impact can help the entity determine their influence on other users of the social networking website. The impact can help the entity determine whether to alter their activity level or the types of activities the entity can engage in to change their impact on a target user group, such as to help increase the impact of the entity on other users. While impact data is discussed with respect to impact on a social networking site, impact data can additionally or alternatively be determined with regard to user engagement with a blog, a question and answer forum, a collaborative forum (e.g., reddit.com, imgur.com, etc.) or other website where a user can post content and other users can view or interact with the content.

A user can compare their impact on users to impacts of other entities (e.g., their competitors) by issuing a query to retrieve their impact numbers and corresponding impact numbers of the other entities. This can help an entity determine if their competitors are reaching more users and/or how they are reaching the users.

The company impact data can indicate how many individual users or individual engagements have engaged with company content occurred in a specific time period. An entity can define a target audience on one or more social networks, such as by defining characteristics of users that the entity would like to reach. The entity can query on those characteristics to determine how many users include those characteristics and/or to determine how many of those users are interacting with the entity content. By monitoring the impact on those users over time, the entity can determine if their impact on those users is increasing or decreasing. By comparing the entity activities to the entity activities of other entities and their impact on the target users, the entity can determine how to alter their content strategy to better engage the target users with their content.

Figure 5:
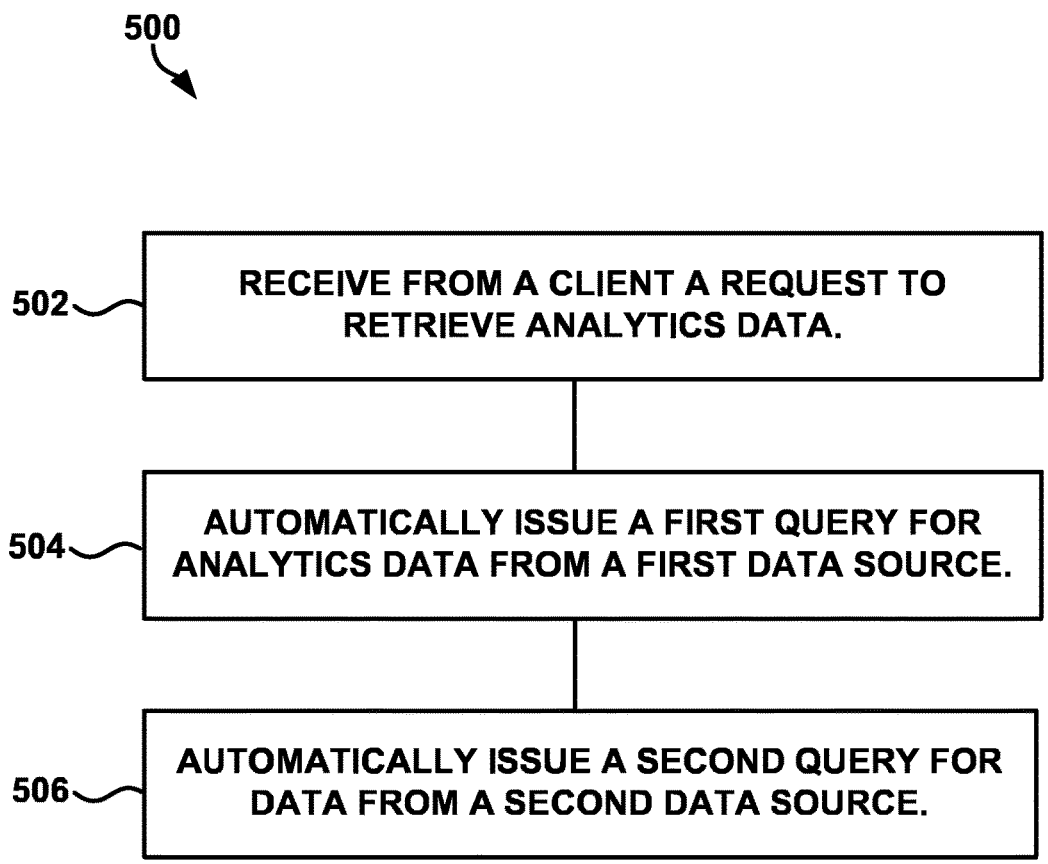
FIG. 5 illustrates, by way of example, a flow diagram of an embodiment of a method for data analytics using a variety of databases.

FIG. 5 illustrates, by way of example, a flow diagram of an embodiment of a method 500 for requesting data and automatically querying multiple data sources to satisfy the request. The method can be implemented using one or more memories and one or more hardware processors configured to implement the API 104 and can be implemented at the API 104. The method 500 as illustrated includes: receiving, from a client, a request to retrieve analytics data, at operation 502; automatically issuing a first query for analytics data from a first data source, at operation 504; and automatically issue a second query for data from a second data source, at operation 506. The method 500 can further include providing the analytics data and/or the data.

The method 500 can further include, before issuing the first query, determining which data sources of a plurality of data sources to query and an order in which to query the data sources by based upon a return type of the request in an API library file. The request received at operation 502 can be for article content and user engagement numbers with the article content, the first query at operation 504 can be for article identification numbers by user engagement with the article content, and the second query issued at operation 506 can be for article content and metadata of the articles associated with the article identification numbers. The analytics data includes the user engagement numbers and the data includes content and metadata of the articles.

The request received at operation 502 can be in a verbose format. The method 500 can further include, before issuing the first query, issuing a third query to a third data source to retrieve one or more key values associated with verbose language in the request. The method 500 can further include before issuing the first query, determining a query format for the first query by looking up a query format for the first data source in a file of an API library file, and/or before issuing the first query, determining a data source path for the first data source by looking up the data source path in the file of the API library 110.

The method 500 can further include determining a data structure of the data stored on the first data source based upon a data structure definition in the file of the API library 110. The request received at operation 502 can include a request for impact data of one or more users of a social networking website, the impact data indicating how many users including specified characteristics are engaging with postings of the one or more users on the social networking website. The first query, issued at operation 504, can be to determine how many users of the social networking website include the specified characteristics and the second query, issued at operation 506 can be to determine how many of the users that include the specified characteristics have engaged with the postings of the one or more users on the social networking website.

Figure 6:
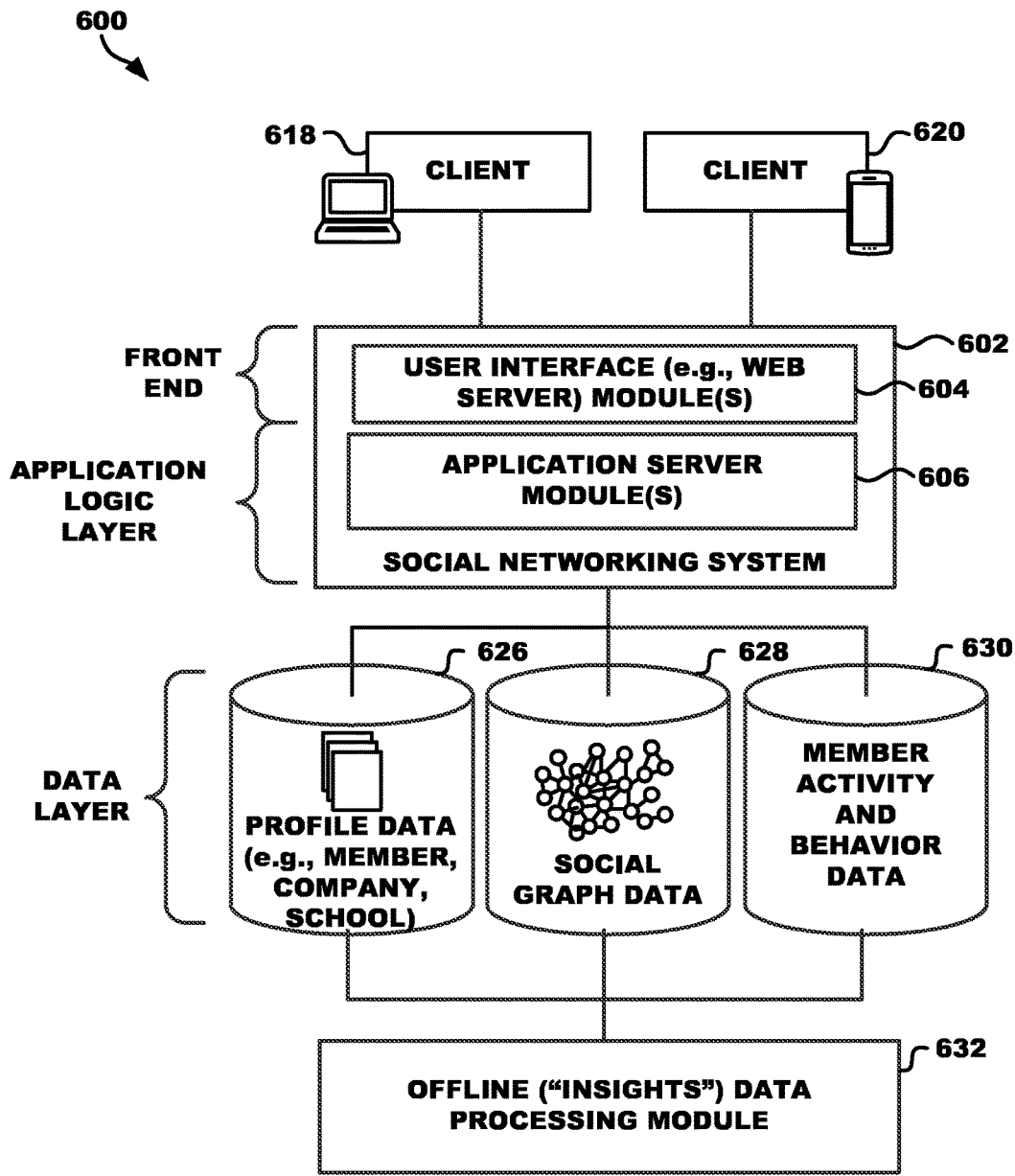
FIG. 6 illustrates, by way of example, a block diagram of an embodiment of a computer network environment in which the API can be deployed.

FIG. 6 illustrates, by way of example, a block diagram illustrating an embodiment of a computer network environment 600, in which the system 100, 200, or 300 can be deployed. The data sources 106A-C can include one or more of the profile data 626, the social graph data 628, and/or the member activity and behavior data 630. The API 104 and the library 110 can be implemented in the application logic layer. The UI 102 can be implemented in the front end and connected to the client 618 or 620. The data source servers 112A-C and the data sources 106A-C can be included in the data layer. A user can request data from the profile data 626, the social graph data 628, and/or the member activity and behavior data 630 through the UI 102 and the API 104.

The computer network environment 600 can include a social networking system 602 that includes one or more application server modules 606 that provide any number of applications and services that leverage the social graph data database 628 maintained by the social networking system 602. For example, the social networking system 602 may provide a photo sharing application, a job posting and browsing service, a question-and-answer service, and so forth.

The social network environment 600 can provide a social networking service. A social networking service is an online service, platform and/or site that allows users of the service to build or reflect social networks or social relations among members. Typically, users construct profiles, which may include characteristics (e.g., personal information), such as the member's name, contact information, employment information, photographs, personal messages, status information, links to web-related content, blogs, and so on. In order to build or reflect these social networks or social relations among members, the social networking environment 600 allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes.

As shown in FIG. 6, the front end includes a user interface module (e.g., a web server) 604, which receives requests from various client-computing devices, and communicates appropriate responses to the requesting client devices. Client-computing devices, as shown in FIG. 6, can include a client 618 or client 620. The client 618 or 620 can include a device, such as a laptop, tablet, phone, Smartphone, desktop, Personal Digital Assistant (PDA), e-reader, or other computing device, such as a computing device capable of connecting to the internet. The client 618 or 620 can communicate with the social networking system using the user interface (UI) module 604. For example, the UI module 604 may receive requests in the form of Hypertext Transport Protocol (HTTP) request, File Transfer Protocol (FTP), Transmission Control Protocol (TCP)/Internet Protocol (IP), Simple Object Access Protocol (SOAP), or other web-based, Application Programming Interface (API) request.

The application logic layer can include various application server modules 606, which, in conjunction with the UI module 604, generate various UIs (e.g., web pages) with data retrieved from one or more sources of various data sources in the data layer. In some embodiments, individual application server modules 606 can be used to implement the functionality associated with various applications, services and/or features of the social networking environment 600. For instance, a social networking service may provide a broad variety of applications and services, to include the ability to search for and browse user profiles, job listings, or news articles. Additionally, applications and services may allow users to share content with one another, for example, via email, messages, and/or content postings (sometimes referred to as status updates) via a data feed (e.g., specifically tailored) to a user.

In connection with a job posting service, an automated (e.g., system or service-generated) content posting may be generated and communicated to a user to highlight a job that the user may be interested in. A wide variety and number of other applications or services may be made available to users of a social networking service, and will generally be embodied in their own instance of an application server module 606.

As shown in FIG. 6, the data layer includes several databases, such as a database 626 for storing profile data, including both user profile data as well as profile data for various entities (e.g., companies, schools, and other organizations) represented in the social graph maintained by the social networking service, such as in the social graph data database 628. Consistent with some embodiments, when a person initially registers to become a user of the social networking service, the person can be prompted to provide some personal information, such as his or her name, age (e.g., birthdate), gender, interests, contact information, home town, address, the names of the user's spouse and/or family users, educational background (e.g., schools, majors, matriculation and/or graduation dates, etc.), employment history, skills, professional organizations, and so on. This information, generally referred to as user profile information or user characteristic(s), is stored, for example, in the database 626.

Similarly, when a representative of an organization initially registers the organization with the social networking service (e.g., represented by the social networking system 602), the representative may be prompted to provide certain information about the organization. This information—generally referred to as company profile information—may be stored, for example, in the database 626 or another database (not shown). With some embodiments, the profile data may be processed (e.g., in the background or offline, by the offline data processing module 632) to generate various derived profile data. For example, if a user has provided information about various job titles the user has held with the same or different companies, or for how long, this information can be used to infer or derive a user profile attribute indicating the user's overall seniority level, or seniority level within a particular company. With some embodiments, importing or otherwise accessing data from one or more externally hosted data sources may enhance profile data for both users and organizations. For instance, with companies in particular, financial data may be imported from one or more external data sources, and made part of a company's profile.

Once registered, a user may invite other users, or be invited by other users, to connect via the environment 600. A "connection" may require a bi-lateral agreement by the users, such that both users acknowledge the establishment of the connection. Similarly, with some embodiments, a user may elect to "follow" another user. In contrast to establishing a connection, the concept of "following" another user typically can be a unilateral operation, and at least with some embodiments, does not require acknowledgement or approval by the user that is being followed. When one user follows another user, the user who is following may receive content postings, status updates, or other content postings published by the user being followed, or relating to various activities undertaken by the user being followed. Similarly, when a user follows an organization, the user becomes eligible to receive content postings published on behalf of the organization and/or system or service-generated content postings that relate to the organization. For instance, messages or content postings published on behalf of an organization that a user is following will appear in the user's personalized feed. In any case, the various associations and relationships that the users establish with other users, or with other entities and objects, can be stored and maintained within the social graph data database 628.

As users interact with the various applications, services, or content made available via the environment 600, the users' behavior (e.g., content viewed, links selected, etc.) may be monitored and information concerning the users' behavior may be stored, for example, in the user activity and behavior data database 630. This information may be used to infer a user's intent and/or interests, and to classify the user as being in various categories. For example, if the user performs frequent searches of job listings, thereby exhibiting behavior indicating that the user is a likely job seeker, this information can be used to classify the user as a job seeker. This classification can then be used as an attribute or characteristic. The attribute or characteristic can be used by others to target the user for receiving advertisements, messages, content postings, or a recommendation. Accordingly, a company that has available job openings can publish a content posting that is specifically directed to certain users (e.g., users) of the social networking service who are likely job seekers, and thus, more likely to be receptive to recruiting efforts.

Figure 7:
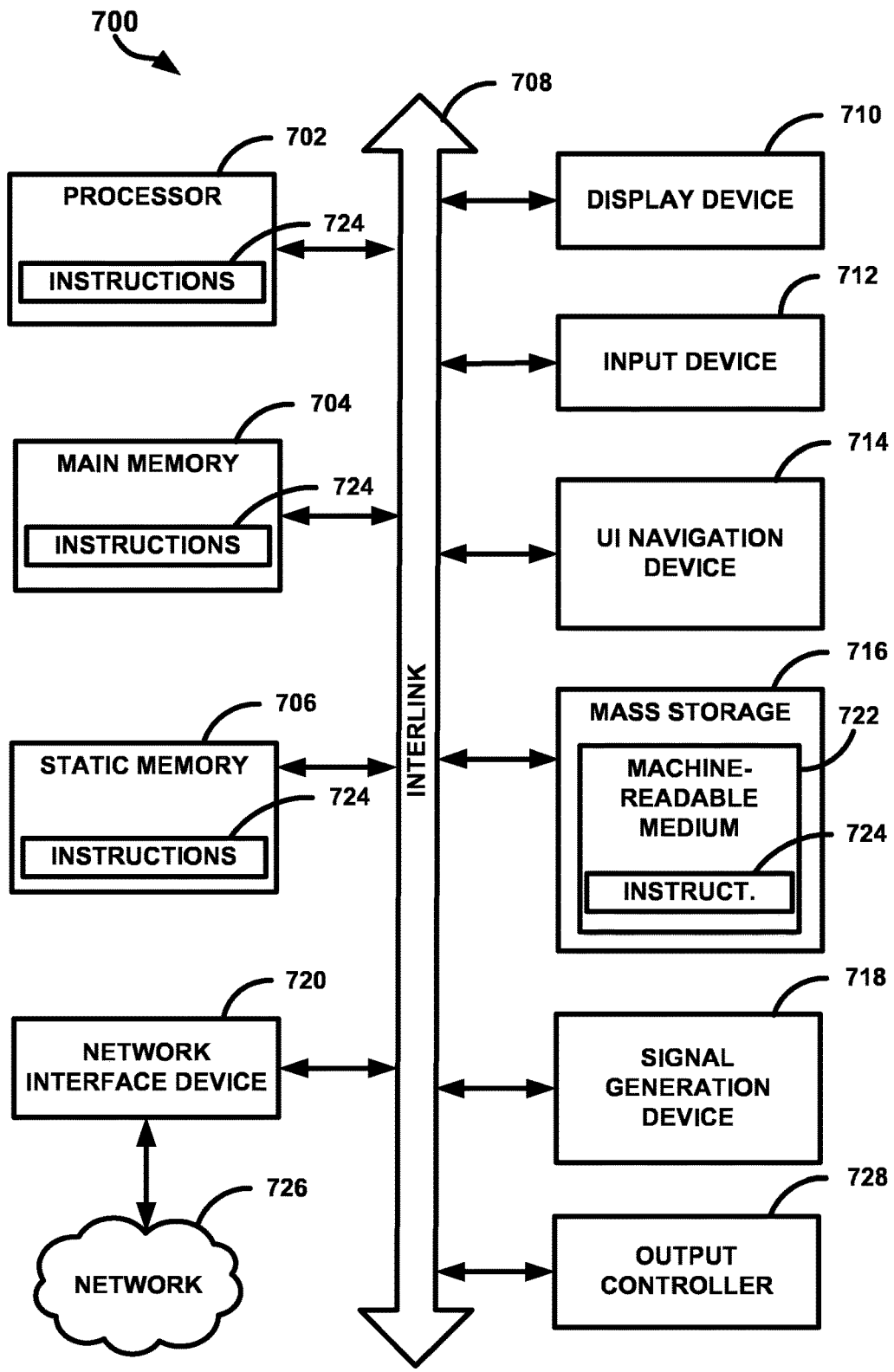
FIG. 7 illustrates, by way of example, a block diagram of an example of a device upon which any of one or more techniques (e.g., methods) discussed herein can be performed.

FIG. 7 shows a block diagram of an example of a computing device 700, in accord with one or more embodiments. The device 700 (e.g., a machine) can operate so as to perform one or more of the programming or communication techniques (e.g., methodologies) discussed herein. In some examples, the device 700 can operate as a standalone device or can be connected (e.g., networked) to one or more modules, such as the UI 102, the API 104, and/or the data source servers 112A-C as discussed herein. An item of the system 100, 200, 300, or 600 can include one or more of the items of the device 700. For example one or more of the UI 102, API 104, data source servers 112A-C, social networking system 602 (e.g., the user interface module 604 and/or the application server module(s)), and the offline data processing module 632 can include one or more of the items of the device 700.

Embodiments, as described herein, can include, or operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, logic gates (e.g., combinational and/or state logic), circuits, etc.) and a computer readable medium containing instructions, where the instructions configure the execution units to carry out a specific operation when in operation. The configuring can occur under the direction of the executions units or a loading mechanism. Accordingly, the execution units are communicatively can be coupled to the computer readable medium when the device is operating. In this example, the execution units can be a user of more than one module. For example, under operation, the execution units can be configured by a first set of instructions to implement a first module at one point in time and reconfigured by a second set of instructions to implement a second module.

Device (e.g., computer system) 700 can include a hardware processor 702 (e.g., a central processing unit (CPU), a graphics processing unit (GPU), a hardware processor core, or any combination thereof), a main memory 704 and a static memory 706, some or all of which can communicate with each other via an interlink (e.g., bus) 708. The device 700 can further include a display unit 710, an input device 712 (e.g., an alphanumeric keyboard), and a user interface (UI) navigation device 714 (e.g., a mouse). In an example, the display unit 710, input device 712 and UI navigation device 714 can be a touch screen display. The device 700 can additionally include a storage device (e.g., drive unit) 716, a signal generation device 718 (e.g., a speaker), and a network interface device 720. The device 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 can include a machine readable medium 722 on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the device 700. In an example, one or any combination of the hardware processor 702, the main memory 704, the static memory 706, or the storage device 716 can constitute machine readable media.

While the machine readable medium 722 is illustrated as a single medium, the term "machine readable medium" can include a single medium or multiple media (e.g., a centralized or distributed database, and/or associated caches and servers) configured to store the one or more instructions 724. The term "machine readable medium" can include any tangible medium that is capable of storing, encoding, or carrying instructions for execution by the device 700 and that cause the device 700 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 700, and includes digital or analog communications signals or other intangible medium to facilitate communication of such software.

EXAMPLES AND NOTES

The present subject matter can be described by way of several examples.

Example 1 can include or use subject matter (such as an apparatus, a method, a means for performing acts, or a machine readable medium including instructions that, when performed by the machine, can cause the device to perform acts), such as can include or use automatically issuing, in response to receiving a request from a client to retrieve analytics data, a first query for analytics data from a first data source, the first query in a first format, automatically issuing, in response to receiving the request, a second query for data from a second data source different from the first data source, the second query in a second format different from the first format, and providing the analytics data and the data.

Example 2 can include or use, or can optionally be combined with the subject matter of Example 1, to include or use, wherein the operations further comprise before issuing the first query, selecting the first and second data sources from a plurality of data sources and determining an order in which to query the data sources based upon looking up a return type of the request in a library file.

Example 3 can include or use, or can optionally be combined with the subject matter of at least one of Examples 1-2 to include or use, wherein the request is for article content and user engagement numbers with the article content, the first query is for article identification numbers by user engagement with the article content, the second query is for article content and metadata of the articles associated with the article identification numbers, and wherein the analytics data includes the user engagement numbers and the data includes the content and metadata of the articles.

Example 4 can include or use, or can optionally be combined with the subject matter of at least one of Examples 1-3 to include or use, wherein the request is in a verbose format and the medium further comprises instructions stored thereon, which when executed by the machine cause the machine to, before issuing the first query, issue a third query to a third data source to retrieve one or more key values associated with verbose language in the request.

Example 5 can include or use, or can optionally be combined with the subject matter of at least one of Examples 1-4 to include or use, wherein the operations further comprise before issuing the first query, determine a query format for the first query by looking up a query format for the first data source in a file of an API library file, and before issuing the first query, determine a data source path indicating a location of the first data source by looking up the data source path in the file of the API library.

Example 6 can include or use, or can optionally be combined with the subject matter of Example 5 to include or use, wherein the operations further comprise determining a data structure of the data stored on the first data source by looking up the data structure in the file of the API library.

Example 7 can include or use, or can optionally be combined with the subject matter of at least one of Examples 1-6 to include or use, wherein the request is for impact data of one or more users of a social networking website, the impact data indicating how many users having specified characteristics are engaging with postings of the one or more users on the social networking website.

Example 8 can include or use, or can optionally be combined with the subject matter of Example 7 to include or use, wherein the instructions of issuing the first query include instructions, which when executed by the machine cause the machine to issue a query configured to determine how many users of the social networking website have the specified characteristics and the instructions for issuing the second query include instructions, which when executed by the machine cause the machine to issue a query configured to determine how many of the users that have the specified characteristics have engaged with the postings of the one or more users on the social networking website.

Example 9 can include or use subject matter (such as an apparatus, a method, a means for performing acts, or a machine readable medium including instructions that, when performed by the machine, can cause the device to perform acts), such as can include or use a method comprising operations performed using one or more hardware processors, the operations comprising, at an Application Programming Interface (API): receiving from a client a request to retrieve analytics data, in response to receiving the request automatically issuing a first query for analytics data from a first data source, the first query in a first format, and automatically issuing a second query for data from a second data source different from the first data source, the second query in a second format different from the first format. Example 9 can further include or use, at the API, providing the analytics data and the data.

Example 10 can include or use, or can optionally be combined with the subject matter of Example 9 to include or use, before issuing the first query, determining which data sources of a plurality of data sources to query and an order in which to query the data sources by based upon a return type of the request in an API library file.

Example 11 can include or use, or can optionally be combined with the subject matter of at least one of Examples 9-10 to include or use, wherein the request is for article content and user engagement numbers with the article content, the first query is for article identification numbers by user engagement with the article content, the second query is for article content and metadata of the articles associated with the article identification numbers, and wherein the analytics data includes the user engagement numbers and the data includes content and metadata of the articles.

Example 12 can include or use, or can optionally be combined with the subject matter of at least one of Examples 9-11 to include or use, wherein the request is in a verbose format and the method further comprises, before issuing the first query, issuing a third query to a third data source to retrieve one or more key values associated with verbose language in the request.

Example 13 can include or use, or can optionally be combined with the subject matter of at least one of Examples 9-12 to include or use before issuing the first query, determining a query format for the first query by looking up a query format for the first data source in a file of an API library file, and before issuing the first query, determining a data source path for the first data source by looking up the data source path in the file of the API library.

Example 14 can include or use, or can optionally be combined with the subject matter of Example 13 to include or use determining a data structure of the data stored on the first data source based upon a data structure definition in the file of the API library.

Example 15 can include or use, or can optionally be combined with the subject matter of at least one of Examples 9-14 to include or use, wherein the request is for impact data of one or more users of a social networking website, the impact data indicating how many users including specified characteristics are engaging with postings of the one or more users on the social networking website.

Example 16 can include or use, or can optionally be combined with the subject matter of Example 15 to include or use, wherein the first query is to determine how many users of the social networking website include the specified characteristics and the second query is to determine how many of the users that include the specified characteristics have engaged with the postings of the one or more users on the social networking website.

Example 17 can include or use subject matter (such as an apparatus, a method, a means for performing acts, or a machine readable medium including instructions that, when performed by the machine, can cause the device to perform acts), such as can include or use one or more hardware processors, one or more memories communicatively coupled to the one or more hardware processors, the one or more memories including Application Programming Interface (API) library files stored thereon, the API library files detailing query format definitions, data structure definitions, and a data source path for each data source communicatively coupled to the one or more processors, the one or more memories further including instructions stored thereon, which when executed by the one or more processors, cause the one or more processors to perform operations comprising automatically issuing, in response to receiving a request from a client to retrieve analytics data, a first query for analytics data from a first data source, the first query in a first format, automatically issuing, in response to receiving the request, a second query for data from a second data source different from the first data source, the second query in a second format different from the first format, and provide the analytics data and the data.

Example 18 can include or use, or can optionally be combined with the subject matter of Example 17 to include or use, wherein the API library files further comprise a data source hierarchy file including a hierarchy of data sources to query based on data requested in the request, and wherein the operations further comprise, before issuing the first query, determining which data sources of a plurality of data sources to query and an order in which to query the data sources based upon a type of data requested and defined in the hierarchy file.

Example 19 can include or use, or can optionally be combined with the subject matter of at least one or Examples 17-18 to include or use, wherein the request is for article content and user engagement numbers with the article content, the first query is for article identification numbers by user engagement with the article content, the second query is for article content and metadata of the articles associated with the article identification numbers, and wherein the analytics data includes the user engagement numbers and the data includes the content and metadata of the articles.

Example 20 can include or use, or can optionally be combined with the subject matter of at least one or Examples 17-19 to include or use, wherein the request is in a verbose format and the operations further comprise, before issuing the first query, issuing a third query to a third data source to retrieve one or more key values associated with verbose language in the request.

The above Description of Embodiments includes references to the accompanying figures, which form a part of the detailed description. The figures show, by way of illustration, specific embodiments in which methods, apparatuses, and systems discussed herein can be practiced. These embodiments are also referred to herein as "examples" or "embodiments". Such embodiments (e.g., examples) can include elements in addition to those shown or described. However, the present inventors also contemplate embodiments in which only those elements shown or described are provided. Moreover, the present inventors also contemplate embodiments using any combination or permutation of those elements shown or described (or one or more aspects thereof), either with respect to a particular embodiment (or one or more aspects thereof), or with respect to other embodiments (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or techniques described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described embodiments (or one or more aspects thereof) can be used in combination with each other. Other embodiments can be used, such as by one of ordinary skill in the all upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A non-transitory machine readable medium comprising instructions stored thereon, which when executed by a machine cause the machine to perform operations of an application programming interface (API), the operations comprising:

identify, in response to receiving a request for analytics data from a user interface of a client, one or more natural language words in the request;

automatically issue a first query to a first data source for respective numerical key values associated with each of the one or more natural language words;

identify, in response to receiving the request, a return type of the request;

determine, by looking up the return type in a library file that includes data indexed by the return type, a second data source and a third data source to which to issue second and third queries, respectively, a first format for the second query and a second format for the third query, an order in which to query the second and third data sources, and a data source path for data on the second and third data sources, respectively;

automatically issue, after looking up the return type of the request, the second query for data from the second data source using the data source path of the second data source, the second query in the determined first format and including a key value of the respective key values received from the first data source;

automatically issue, after looking-up the return type, the third query for analytics data from the third data source different from the second data source and using the data source path of the third data source, the third query in the determined second format different from the first format and including data received responsive to issuing the second query; and provide the analytics data obtained via the third query and the data obtained via the second query to the client for presentation responsive to the request.

2. The medium of claim 1, wherein:

the request is for article content and user engagement numbers with the article content, the third query is for user engagement with the article content indexed by article identification numbers, the second query is for article content and metadata of the articles associated with the article identification numbers, and wherein the analytics data includes the user engagement numbers and the data includes the content and metadata of the articles.

3. The medium of claim 1, wherein the operations further comprise determining a data structure of the data stored on the first data source by looking up the data structure in the library file.

4. The medium of claim 1, wherein the request is for impact data of one or more users of a social networking website, the impact data indicating how many users having specified characteristics are engaging with postings of the one or more users on the social networking website.

5. The medium of claim 4, wherein the instructions of issuing the second query include instructions, which when executed by the machine cause the machine to issue a query configured to determine how many users of the social networking website have the specified characteristics and the instructions for issuing the third query include instructions, which when executed by the machine cause the machine to issue a query configured to determine how many of the users that have the specified characteristics have engaged with the postings of the one or more users on the social networking website.

6. A method comprising operations performed using one or more hardware processors to implement an application programming interface (API), the operations comprising:

receiving, from a user interface of a client, a request to retrieve analytics data;

in response to receiving the request:

identifying one or more natural language words in the request;

automatically issuing a first query to a first data source for respective numerical key values associated with each of the one or more natural language words;

identifying a return type of the request;

determining, by looking up the return type in a library file that includes data indexed by the return type, a second data source and a third data source to which to issue second and third queries, respectively, a first format for the second query and a second format for the third query, an order in which to query the second and third data sources, and a data source path for data on the second and third data sources, respectively;

automatically issuing, after looking up the return type and using the data source path of the second data source, the second query for data from the second data source, the second query in the determined first format and including a key value of the respective key values from the first data source;

automatically issuing, after looking up the return type of the request and using the data source path of the third data source, the third query for analytics data from the third data source different from the first and second data sources, the third query in the determined second format different from the first format and including data received responsive to issuing the second query; and providing the analytics data obtained via the third query and the data obtained via the second query to the client for presentation responsive to the request.

7. The method of claim 6, wherein:

the request is for article content and user engagement numbers with the article content, the third query is for article identification numbers by user engagement with the article content, the second query is for article content and metadata of the articles associated with the article identification numbers, and wherein the analytics data includes the user engagement numbers and the data includes content and metadata of the articles.

8. The method of claim 6, further comprising determining a data structure of the data stored on the second data source based upon a data structure definition in the library file.

9. The method of claim 6, wherein the request is for impact data of one or more users of a social networking website, the impact data indicating how many users including specified characteristics are engaging with postings of the one or more users on the social networking website.

10. The method of claim 9, wherein the second query is to determine how many users of the social networking website include the specified characteristics and the third query is to determine how many of the users that include the specified characteristics have engaged with the postings of the one or more users on the social networking website.

11. A system comprising:

one or more hardware processors;

one or more memories communicatively coupled to the one or more hardware processors, the one or more memories including one or more library files stored thereon, the library files including data indexed by a return type, the library files detailing query format definitions, data structure definitions, data sources and an order in which to query the data sources, query format definitions for each of the data sources, and a data source path for each data source communicatively coupled to the one or more processors, the one or more memories further including instructions stored thereon, which when executed by the one or more processors, cause the one or more processors to perform operations of an application programming interface (API), the operations comprising:

identifying one or more natural language words in a request from a client to retrieve analytics data;

automatically issuing a first query to a first data source of the data sources for respective numerical key values associated with each of the one or more natural language words;

identifying a return type of the request;

determining, by looking up the return type in a library file that includes data indexed by the return type, a second data source of the data sources and a third data source of the data sources to which to issue second and third queries, respectively, a first format for the second query and a second format for the third query, an order in which to query the second and third data sources, and a data source path for data on the second and third data sources, respectively;

automatically issuing, after looking up the return type of the request and using the data source path of the second data source, the second query for data from the second data source, the second query in the determined first format and including a key of the respective keys received from the first data source;

automatically issuing, after looking up the return type of the request and using the data source path of the third data source, the third query for analytics data from the third data source different from the first and second data sources, the third query in the determined second format different from the first format and including data received responsive to issuing the second query; and providing the analytics data obtained via the third query and the data obtained via the second query to the client for presentation responsive to the request.

12. The system of claim 11, wherein:

the request is for article content and user engagement numbers with the article content, the third query is for article identification numbers by user engagement with the article content, the second query is for article content and metadata of the articles associated with the article identification numbers, and wherein the analytics data includes the user engagement numbers and the data includes the content and metadata of the articles.

* * * * *